United States Patent
Hicks et al.

(10) Patent No.: US 7,963,345 B1
(45) Date of Patent: Jun. 21, 2011

(54) APPARATUS AND METHOD FOR ADJUSTING TENSION OF A HARROWING CHAIN

(76) Inventors: Donnie Wayne Hicks, Lubbock, TX (US); Randy Joe Holloway, Lubbock, TX (US); Chad Phares, Lubbock, TX (US)

(*) Notice: Subject to any disclaimer, the term of this patent is extended or adjusted under 35 U.S.C. 154(b) by 0 days.

(21) Appl. No.: 12/631,500

(22) Filed: Dec. 4, 2009

(51) Int. Cl.
*A01B 35/00* (2006.01)

(52) U.S. Cl. ........................ 172/612; 172/579

(58) Field of Classification Search .............. 172/518, 172/527, 567, 568, 579, 586, 311, 440, 441, 172/551, 576, 595, 583, 140, 776, 612
See application file for complete search history.

(56) References Cited

U.S. PATENT DOCUMENTS

| | | | |
|---|---|---|---|
| 2,191,537 A | | 2/1940 | Miller |
| 2,327,021 A | * | 8/1943 | Cushman ............... 74/501.5 R |
| 2,363,228 A | * | 11/1944 | Cade ........................ 74/501.5 R |
| 2,363,229 A | * | 11/1944 | Cade ........................ 74/501.5 R |
| 2,825,983 A | | 3/1958 | Finn |
| 3,327,787 A | | 6/1967 | Adee |
| 4,893,682 A | | 1/1990 | Smallacombe |
| 5,794,712 A | | 8/1998 | Phillips |
| 5,881,820 A | | 3/1999 | Baker |
| 6,484,812 B1 | * | 11/2002 | Clark ........................... 172/540 |
| 7,607,489 B2 | | 10/2009 | Kelly et al. |
| D615,107 S | | 5/2010 | Kelly et al. |
| D615,108 S | | 5/2010 | Kelly et al. |
| D615,562 S | * | 5/2010 | Kelly et al. ................. D15/27 |
| D624,938 S | | 10/2010 | Kelly et al. |
| D628,600 S | | 12/2010 | Hicks |
| 7,857,073 B2 | | 12/2010 | Kelly et al. |

FOREIGN PATENT DOCUMENTS

| | | | |
|---|---|---|---|
| SU | 745395 A | * | 7/1980 |
| SU | 982551 A | * | 12/1982 |
| SU | 1523061 A2 | * | 11/1989 |

OTHER PUBLICATIONS

Author Unknown, Fast Movers SA 2009, "Kelly Grows on US Demand," In Business South Australia, p. 78, from http://www.kellyharrows.com/downloads/.
Author Unknown, Count on the Kelly Diamond Harrow: Versatility Aids Crop Productivity, from http://www.kellyharrows.com/downloads/.
Author Unknown, Kelly Diamond Harrow Proven by Farmers Who Demand Performance, from http://www.kellyharrows.com/downloads/.
Author Unknown, A Special Advertising Report, "Success Came Straight From the Farm Shed," The Australian, Dec. 2, 2010, from http://www.kellyharrows.com/downloads/.
Thompson, Paula, "All The World's A Stage for Kelly," Agribusiness Achievers, Stock Journal, Oct. 28, 2010, p. 21.
Kelly Manufacturing Co., Phillips 4500 Rotary Harrow, Brochure from http://www.kelleymfg.com/Brochure/brochure.aspx.
Author Unknown, "Kelly Engineering Winning Awards for Exporting to Europe and US," from http://www.adelaidenow.com.au.

* cited by examiner

*Primary Examiner* — Robert E Pezzuto
*Assistant Examiner* — Jamie L McGowan
(74) *Attorney, Agent, or Firm* — Klemchuk Kubasta LLP; Darin M. Klemchuk

(57) ABSTRACT

The present disclosure generally provides systems and methods for adjusting tension in a harrowing chain. The system includes a tension adjustment assembly, and the tension adjustment assembly includes a slider assembly. A first end of the slider assembly is coupled to a first end of the harrowing chain, and the slider assembly is configured to slide horizontally. The tension adjustment assembly also includes a compression plate that is configured to apply a compression force to a first spring, which is configured to apply a spring force to the slider assembly. A height adjustment assembly is also coupled to the slider assembly. The height adjustment assembly is configured to vertically adjust the first end of the harrowing chain.

16 Claims, 5 Drawing Sheets

APPARATUS AND METHOD FOR ADJUSTING TENSION OF A HARROWING CHAIN

TECHNICAL FIELD

The present disclosure generally relates to agricultural equipment, and more specifically to a device that adjusts the tension of a harrowing chain of a piece of agricultural equipment.

BACKGROUND

Farmed land, by its nature, undergoes cyclic periods of sowing, growth, and harvest. Sowing, growing, and harvesting of crops require certain conditioning of the soil if successful returns are going to be obtained from the worked area. Conditions left over a farmed area, particularly after harvest, do not normally provide the ideal conditions in which further crops can be sowed. When the main crop is harvested, the soil often includes weeds that need to be destroyed as well as stubble and the like from previous crops requiring uprooting and cutting before any seed can be sowed.

Not only does stubble require uprooting or cutting and weeds still need to be killed off, but there is also the further requirement of having the soil leveled such that sowing implements responsible for reintroducing a new crop into the field can do so efficiently and expeditiously.

Thus, it may be important to cultivate the surface of the soil. An agricultural implement including a harrowing chain may be used for this purpose. This operation may be distinct in its effect from a ploughing operation, which is typically used for deeper cultivation. Harrowing is often carried out on fields to follow the rough finish left by ploughing operations. The purpose of this harrowing is generally to break up clods and lumps of soil and to provide a finer finish, a good tilth, or soil structure that is suitable for seeding and planting operations. Such coarser harrowing may also be used to remove weeds and to cover seed after sowing. Often a harrowing implement is pulled over the land by a tractor. The harrowing implement may be a useful tool for farming rice, corn, wheat, beans, milo, and sunflowers.

Harrowing agricultural implements are common in the art. Examples of harrowing agricultural implements include U.S. Pat. No. 5,881,820 ("Baker") and U.S. patent application Ser. No. 11/765,182 (Pub. No. U.S. 2008-0314606 A1) ("Kelly").

During normal operation, slack may increase in the harrowing chain to the point that it no longer rotates but rather bounces along the ground. Also, harrow disks in the harrowing chain may become dull or broken causing less effective cultivation. Thus, a harrowing implement should allow for adjustment of the tension of a harrowing chain to allow a harrow disk or a link in the chain to be safely removed. Once a harrow disk or link is removed, the harrowing chain should be able to be safely reattached and its tension should be able to be adjusted such that it easily returns to its operational position.

SUMMARY

Embodiments of the present disclosure generally provide systems and methods for adjusting tension in a harrowing chain. The system includes a tension adjustment assembly, and the tension adjustment assembly includes a slider assembly. A first end of the slider assembly is coupled to a first end of the harrowing chain, and the slider assembly is configured to slide horizontally. The tension adjustment assembly also includes a compression plate that is configured to apply a compression force to a first spring, which is configured to apply a spring force to the slider assembly. A height adjustment assembly is also coupled to the slider assembly. The height adjustment assembly is configured to vertically adjust the first end of the harrowing chain.

In one embodiment, the present disclosure could be used to adjust the tension of a harrowing chain of an agricultural implement. This tension adjustment may allow relief of tension in a harrowing chain such that a harrow disc that has become dull or broken may be safely removed.

In one embodiment, the present disclosure could also be used to add a preset tension to the harrowing chain after it has been reattached to the agricultural implement. Thus, adding the preset tension in accordance with an embodiment of the present disclosure may safely return the harrowing chain to its operational position.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides systems and methods of safely and efficiently adjusting the tension in a harrowing chain of an agricultural implement. Relieving tension in a harrowing chain may make it safe to remove from an agricultural implement to allow removal and replacement of worn or broken harrow disks or links in a harrowing chain. Moreover, the systems and methods of embodiments of the present disclosure may allow tension to be applied to the harrowing chain after it is reattached to the harrowing implement. This tension may be adjusted to return the harrowing chain to its operational position.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Figure 1:
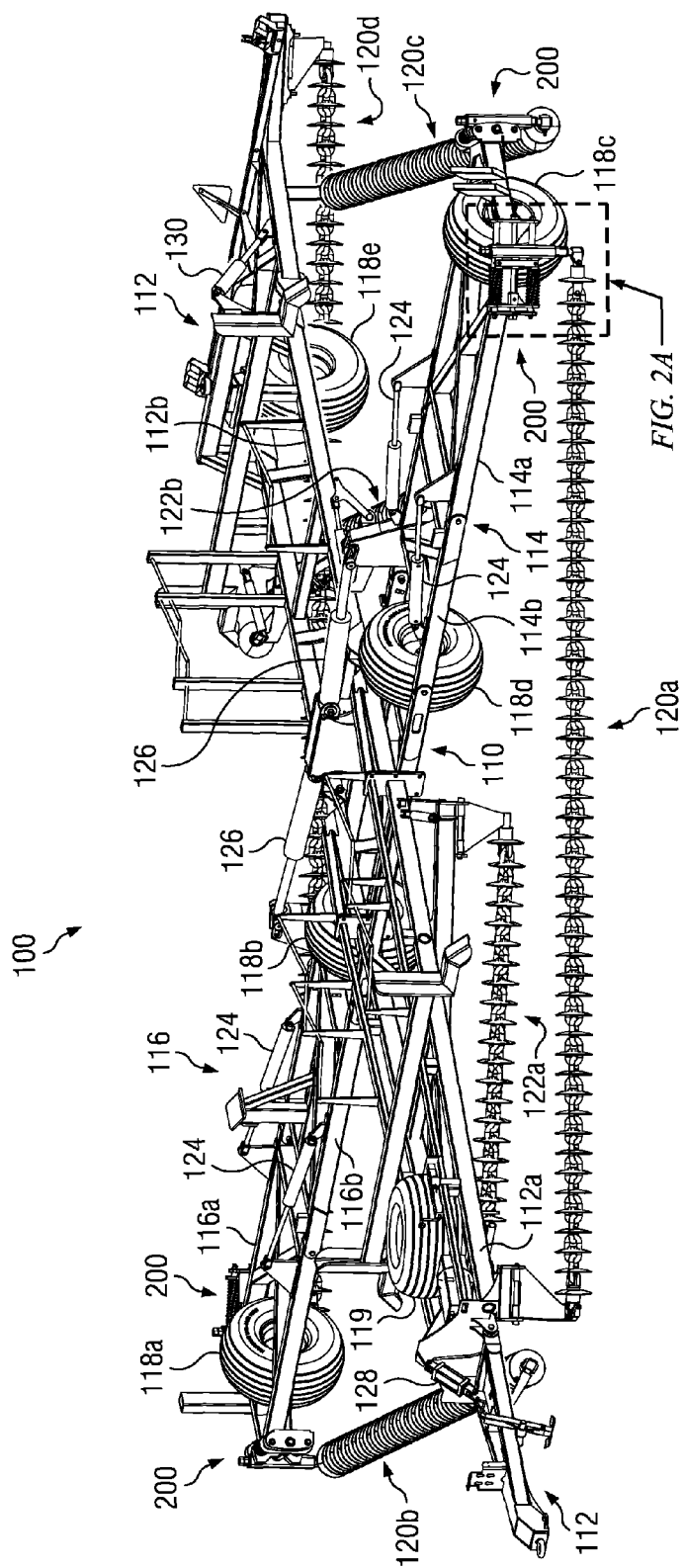
FIG. 1 is a perspective view of an agricultural implement according to one embodiment of the present disclosure.

FIG. 1 shows an agricultural implement 100 (also referred to as a harrow device or a chain disk harrow) in accordance with the present disclosure. It should be understood that the agricultural implement 100 and elements thereof shown in FIGS. 1-3C are for illustrative purposes only and that any other suitable system or subsystem could be used in conjunction with or in lieu of agricultural implement 100 according to one embodiment of the present disclosure.

FIG. 1 illustrates a perspective view of the agricultural implement 100. The agricultural implement 100 includes a frame 110, which has a central frame portion 112, which includes a front central frame portion 112a and a rear central frame portion 112b. Frame 110 also defines a left frame portion 114 and a right frame portion 116, each extending from the central frame portion 112. The left frame portion 114 defines an exterior left frame portion 114a and an interior left frame portion 114b. Similarly, the right frame portion 116 also defines an exterior right frame portion 116a and an interior right frame portion 116b.

The frame 110 may also include a plurality of tires 118. For example, frame 110 may include right exterior tire 118a, right interior tire 118b, left exterior tire 118c, left interior tire 118d, and rear tire 118e. In certain embodiments, spare tire 119 may be also be secured to frame 110. Each of the four tires 118a, b, c, and d may be generally aligned with each other in accordance with an embodiment of the present disclosure, while the rear tire 118e may be a single tire located toward the rear of the frame 110. Having a single rear tire 118e may be an advantage over dual tire systems in that—dual tire systems may accumulate material between the tires (dirt, mud, foliage, etc) that over time may wear out the tires, wheels, and bearings prematurely resulting in excessive downtime and costly repairs.

The frame 110 may support a plurality of exterior harrowing chains 120 and a plurality of interior harrowing chains 122. A first exterior harrowing chain 120a may be supported by the frame 110 generally adjacent the front central frame portion 112a and the exterior left frame portion 114a so that the first exterior harrowing chain 120a extends in a first diagonal direction. A second exterior harrowing chain 120b may be supported by the frame 110 generally adjacent the front central frame portion 112a and the exterior right frame portion 116a so that the second exterior harrowing chain 120b extends in a second diagonal direction generally opposite the diagonal direction of the first exterior harrowing chain 120a. A third exterior harrowing chain 120c may be supported by the frame 110 generally adjacent the exterior left frame portion 114a and the rear central frame portion 112b so that the third exterior harrowing chain 120c extends in generally the same diagonal direction as the second exterior harrowing chain 120b. A fourth exterior harrowing chain 120d may be supported by the frame 110 generally adjacent the exterior right frame portion 116a and the rear end 112b so that the fourth exterior harrowing chain 120d extends in generally the same diagonal direction as the first exterior harrowing chain 120a.

In certain embodiments the frame 110 may support a first interior harrowing chain 122a and a second interior harrowing chain 122b. Interior harrowing chains 122a and 122b may ensure that any surface that is not cultivated by any one of the exterior harrowing chains 120 is cultivated by the interior harrowing chains 122a or b, or the interior harrowing chains 122a and b may act as redundant cultivating instruments. The first interior harrowing chain 122a may be located generally underneath the front central frame portion 112a and extend in a generally diagonal direction which may be approximately parallel to the first and fourth exterior harrowing chains 120a and d. Similarly, the second interior chain 122b may be located rear of the right and left interior tires 118 b and d and extend in an approximately opposite diagonal direction to the first interior harrowing chain 122a and may be generally parallel to second and third exterior harrowing chains 120b and c.

Figure 3A:
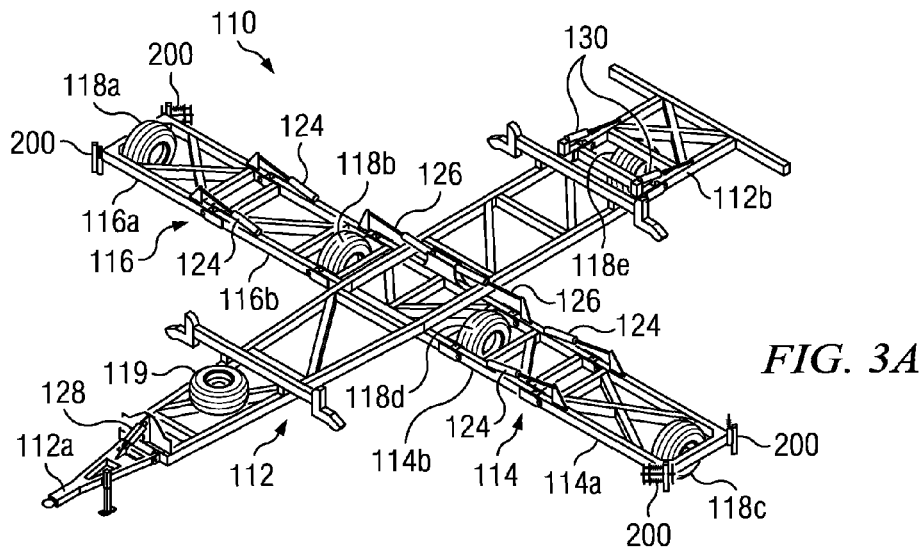
FIGS. 3A-3C illustrate the hydraulic assisted folding of the agricultural implement of FIG. 1 according to one embodiment of the present disclosure.
Figure 3B:
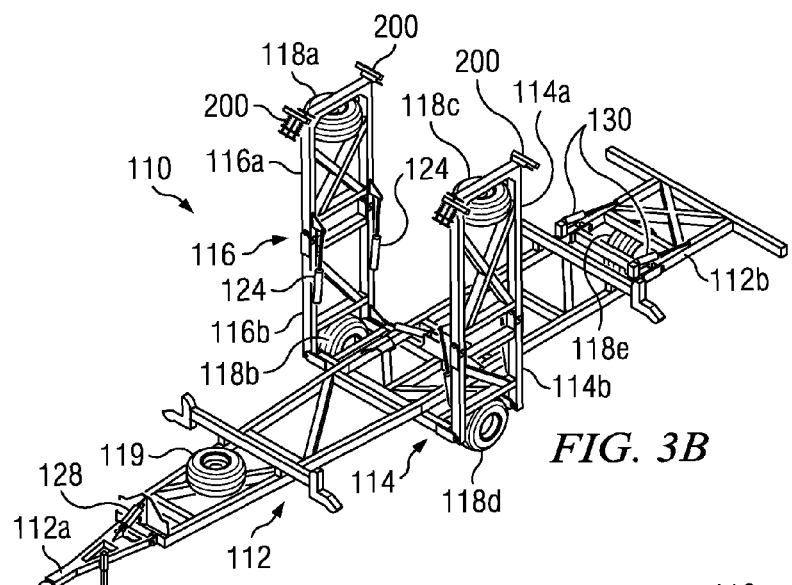
Figure 3C:
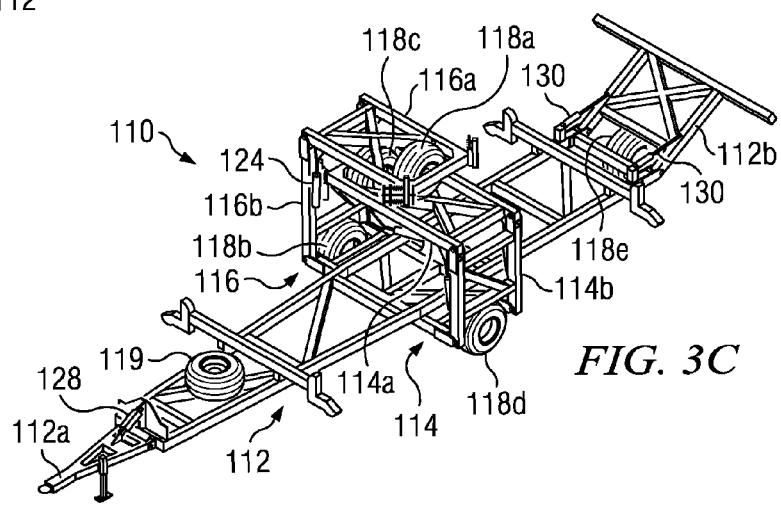

When not in use, the agricultural implement 100 may need to be transported along roadways or other narrow passages. To enable this, the frame 110 is operable to fold with the assistance of exterior hydraulic cylinders 124, interior hydraulic cylinders 126, a front hydraulic cylinder 128, and a rear hydraulic cylinder 130. The folding operation is illustrated in FIGS. 3A-3C. In these illustrations, the exterior harrowing chains 120 and the interior harrowing chains 122a and b have been removed to show the folding operation of the frame 110 more clearly. However, in normal use of certain embodiments of the present disclosure the hydraulically assisted folding operation may be accomplished with the exterior harrowing chains 120 and interior harrowing chains 122a and b continuing to be supported by the frame 110 while the frame 110 is folded as shown in FIGS. 3A-3C.

In certain embodiments, two interior hydraulic cylinders 126 may assist in folding left interior and exterior frame portions 114a and b and right interior and exterior frame portions 116a and b into a generally vertical position relative to central frame portion 112, as shown in FIG. 3B. To complete the folding operation, four exterior hydraulic cylinders 124 may be used to assist in folding left and right exterior frame portions 114a and 116a an additional ninety degrees relative to the respective left and right interior frame portions 114b and 116b. To facilitate clearance of each exterior tire 118a and c, one of either the left or the right exterior frame portions 114a or 116a may be longer than the other. Likewise, one of either the left or the right interior frame portions 114b or 116b may also be longer than the other. Similarly, to make transport easier, front and rear hydraulic cylinders 128 and 130 may assist these portions of the frame 110 to also be folded as shown in FIG. 3C.

Figure 2A:
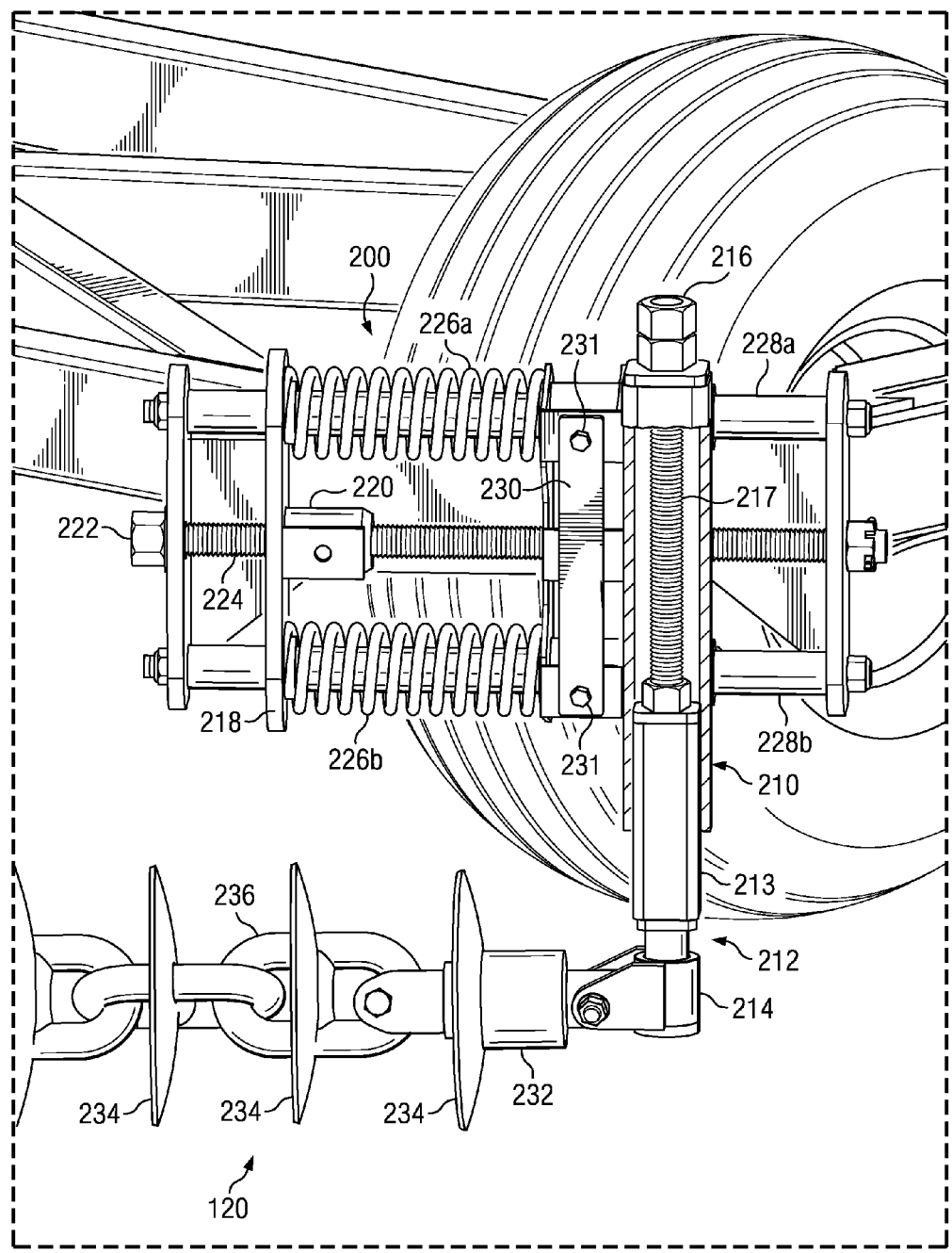
FIG. 2A is a detailed illustration of the tension adjustment assembly shown in FIG. 1 in a first configuration according to one embodiment of the present disclosure.
Figure 2B:
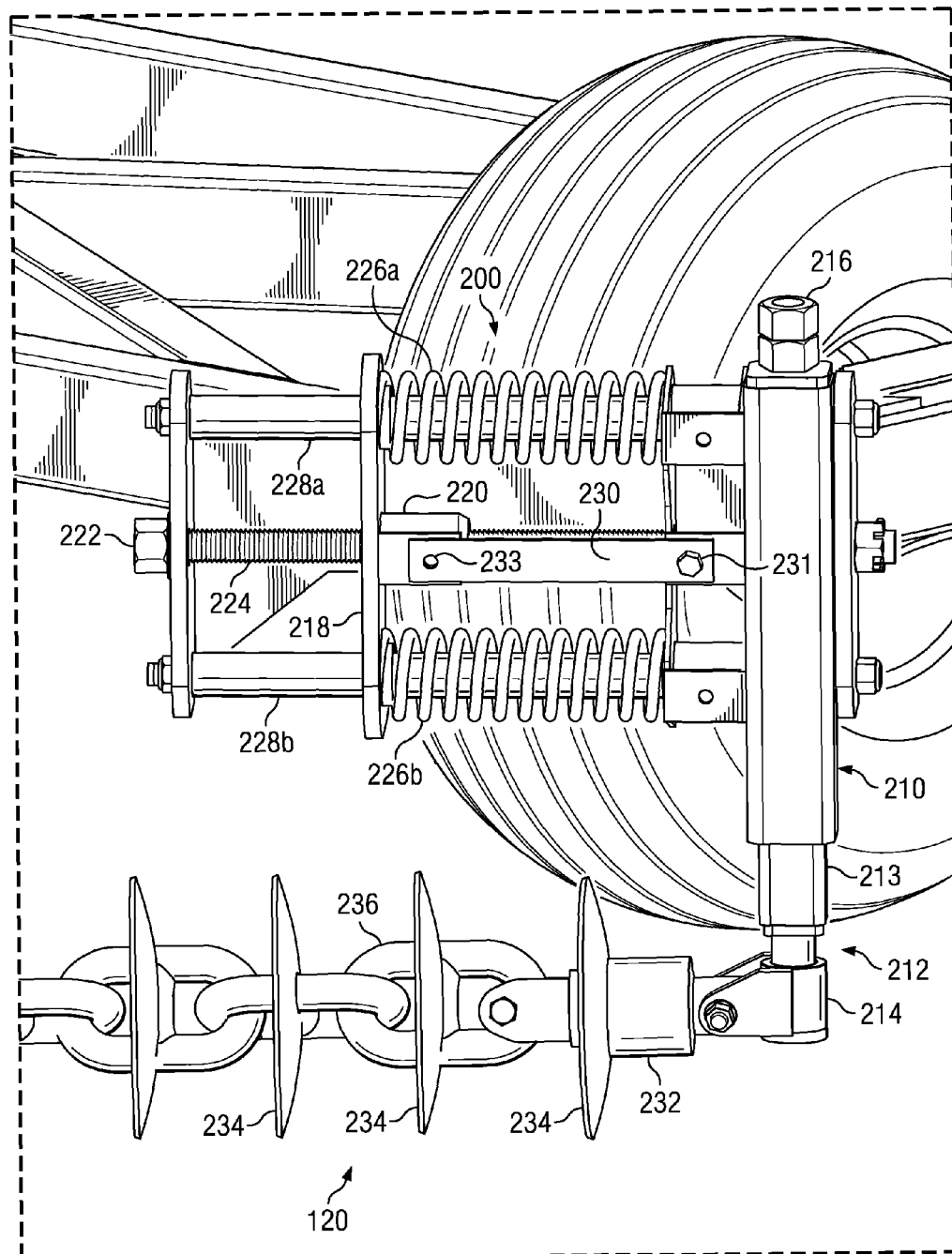
FIG. 2B is a detailed illustration of the tension adjustment assembly shown in FIG. 1 in a second configuration according to one embodiment of the present disclosure.

Each exterior harrowing chain 120 may be joined at one end to a tension adjustment assembly 200. A detail of one of the tension adjustment assemblies 200 is shown in FIGS. 2A and 2B. The tension adjustment assembly 200 may be used to adjust the tension in the respective exterior harrowing chain 120 attached to it. The tension adjustment assembly 200 may also be aligned with the respective harrowing chain 120 to which it is attached. Adjustment of the tension may allow the exterior harrowing chain 120 to be removed if it develops too much slack or a link 236 or a harrow disk 234 in the harrowing chain 120 becomes damaged or broken or otherwise needs to be removed to improve the operation of agricultural implement 100.

The tension adjustment assembly 200 may include a slider assembly 210, a compression plate 218, and an upper spring 226a and a lower spring 226b located between the compression plate 218 and the slider assembly 210. Horizontal movement of the slider assembly 210 either through application of a spring force or other operation may increase or decrease the tension in exterior harrowing chain 120. In certain tension adjustment operations, application of a force may be negative or positive, resulting in an increase or decrease in the tension of the exterior harrowing chain 120. The slider assembly 210 may include bearing surfaces that allow it to slide horizontally along an upper slider bar 228a and a lower slider bar 228b.

The slider assembly 210 may also include a height adjustment assembly 212. Rotating a height adjustment nut 216 may rotate a threaded height adjustment rod 217, which may raise or lower a height adjustment member 213, which may be coupled to a U-joint 214. The exterior harrowing chain 120 may also be coupled to the U-joint 214 such that it will be raised or lowered when the height adjustment nut 216 is rotated.

As previously stated, the tension adjustment assembly 200 may include the compression plate 218. In certain embodiments, the compression plate 218 may include a lug 220 having a threaded interior diameter that cooperates with a horizontal threaded rod 224. For example, rotating the compression adjustment nut 222 will rotate the horizontal threaded rod 224 causing compression plate 218 to move horizontally along the horizontal threaded rod 224. This horizontal movement of the compression plate 218 may increase or decrease the force upper and lower springs 226a and 226b exert on the slider assembly 210 and the corresponding force the slider assembly 210 exerts on the exterior harrowing chain 120. Thus, rotating the compression adjustment nut 222 will either increase or decrease the tension in the exterior harrowing chain 120.

In certain tension adjustment operations, the harrowing chain 120 may have developed enough slack to allow compression adjustment nut 222 to be rotated such that the slider assembly 210 moves linearly to its furthest location away from the compression adjustment nut 222. At this point, a spring-preset bar 230 may be removed from its vertical position on the slider assembly 210 and reattached to the tension adjustment assembly 200 in a horizontal position (as shown in FIG. 2B), with one end attached to the compression plate 218 and the other end attached to the slider assembly 210. In certain embodiments of the present disclosure, the spring-preset bar 230 may not be a bar, but rather may be any horizontal member suitable for joining the compression plate 218 and the slider assembly 210.

The spring-preset bar may be secured in its horizontal position with the fasteners 231 used to secure it in its vertical position. The fasteners 231 may be received by the spring-preset bar holes 233. The fasteners 231 may be a bolt, pin, rivet, screw, and the like. In one embodiment, the fasteners 231 may be half-inch bolts and the spring-preset bar holes 233 may be five-eighths in diameter and approximately twelve inches apart from center to center. Once the spring-preset bar 230 is secured in this position, rotating the compression adjustment nut 222 will cause the compression plate 218 and the slider assembly 210 to move as a single unit and relieve the tension in the harrowing chain 120. Relieving this tension may allow the harrowing chain 120 to be safely removed and a harrow disk 234 and/or a link 236 to also be removed reducing the length of the harrowing chain 120. After removing the harrow disk 234 and/or the link 236, the harrowing chain 120 may be reattached to the agricultural implement 100 and the springs 226a and 226b may be set at a predetermined spring force. This may be accomplished by adjusting the tension in harrowing chain 120 such that the spring-preset bar 230 becomes loose in its horizontal orientation. Because the spring-preset bar holes 233 may be slightly larger than the fasteners 231, at a predetermined tension the upper and lower springs 226a and b will take the load and cause the spring-preset bar 230 to become loose. At this point, the spring-preset bar 230 may be removed from its horizontal position on the tension adjustment assembly 200 and reattached to the slider assembly 210 in its original vertical position (as shown in FIG. 2A).

Also shown in more detail in FIG. 2A, are components of the exterior harrowing chain 120. The respective exterior harrowing chains 120 may include harrow disks 234 coupled to a link 236 in the exterior harrowing chain 120. Harrow disks 234 may be made of abrasive resistant high strength steel. Harrow disks 234 may have a concave side and a convex side. The concave side of each harrow disk 234 may be oriented generally toward the front of the frame 110, and thus be generally oriented more in a direction of travel of agricultural implement 100. Accordingly, the convex side of each harrow disk 234 may be generally oriented toward the rear of the frame 110, and thus more away from a direction of travel of agricultural implement 100. In certain embodiments, the interior harrowing chains 122a and b may include some or all of the same components as the exterior harrowing chains 120 oriented in a similar fashion. A bearing 232 may couple each slider assembly 210 to the respective end of each exterior harrowing chain 120 to allow each exterior harrowing chain 120 to rotate with respect to its respective slider assembly 210.

Figure 2C:
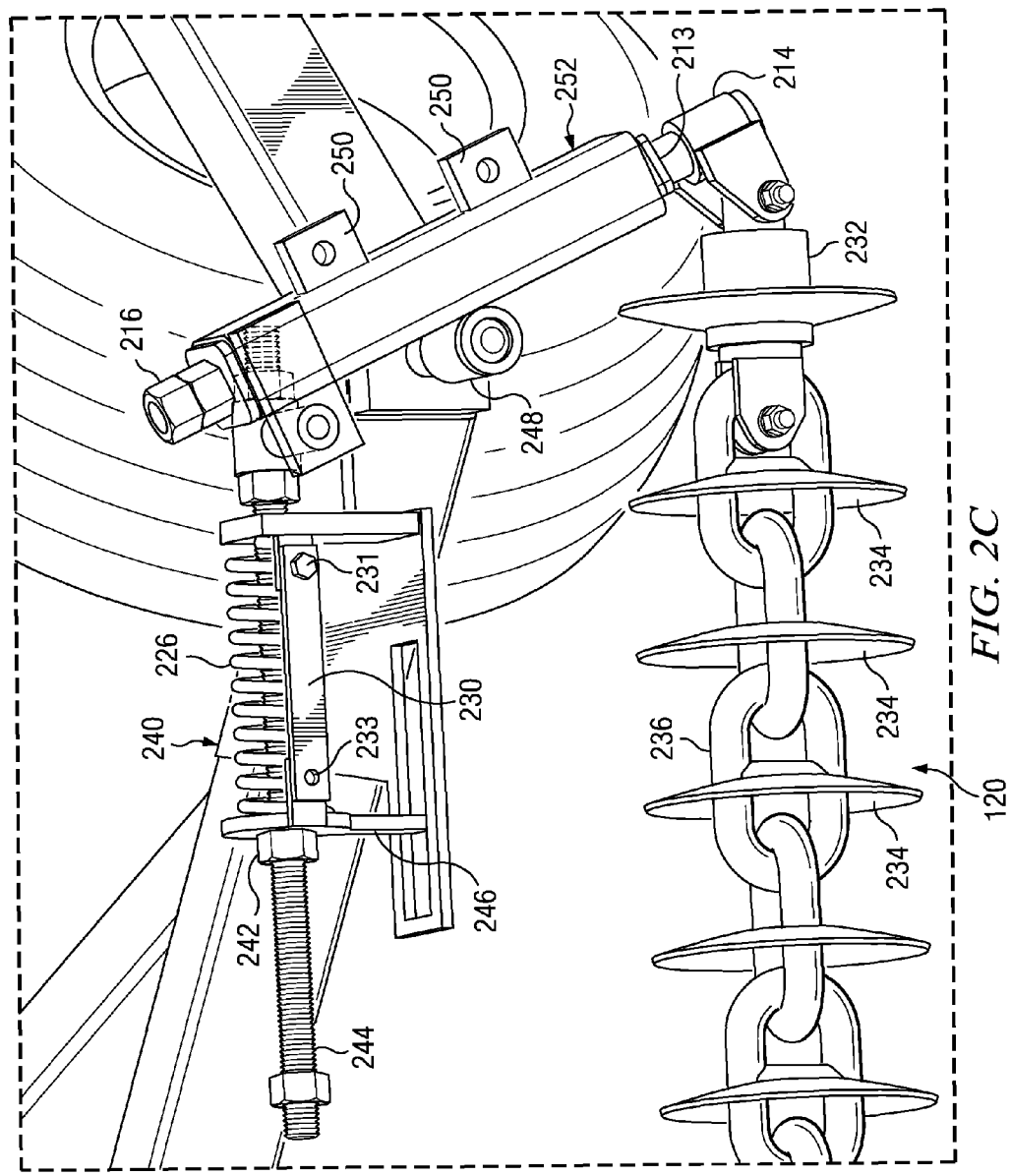
FIG. 2C is a detailed illustration of an alternate embodiment of a tension adjustment assembly according to the teachings of the present disclosure.

A detail of an alternate embodiment of a tension adjustment assembly 240 is shown in FIG. 2C. The alternate embodiment 240 may be used in addition to or in lieu of the tension adjustment assembly 200 on agricultural implement 100. The tension adjustment assembly 240 may be used to adjust the tension in the respective exterior harrowing chain 120 attached to it. The tension adjustment assembly 240 may also be aligned with the respective harrowing chain 120 to which it is attached. The tension adjustment assembly may operate similarly to the tension adjustment assembly shown in FIGS. 2A and 2B, except a pivot assembly 252 may be used in lieu of the slider assembly 210. The pivot assembly 252 may be similar to the slider assembly 210 with respect to its vertical adjustment operation and its coupling to the respective exterior harrowing chain 120. However, rather than sliding horizontally to adjust the tension in the exterior harrowing chain 120, the pivot assembly 252 may rotate about a pivot support 248 that may be coupled to the frame 110.

When the tension in the respective harrowing chain 120 is adjusted, a compression adjustment nut 242 may be rotated to move a compression member 246 generally horizontally along a threaded rod 244. The compression member 246 may include a lock tab to ensure its generally horizontal movement. In normal operation, the spring 226 may carry the tension load of the exterior harrowing chain 120. However, when performing tension adjustment in accordance with the teaching of the present disclosure, the spring-preset bar 230, the fasteners 231, and the spring-preset bar holes 233 may function as herein described with respect to the embodiment shown in FIGS. 2A and 2B. Once the tension adjustment operation has been performed and the agricultural implement 100 is ready to resume normal operation, the spring 226 may take the tension load of the respective exterior harrowing chain 120 by removing the spring-preset bar 230. The spring-preset bar 230 may then be secured to a pair of tabs 250 coupled to the pivot assembly 252.

In use, the frame 110 may be pulled across a ground surface (e.g., a field used for farming) by a tractor or another appropriate pulling device. The exterior harrowing chains 120 and the interior harrowing chains 122a and 122b may act to level the ground surface and additionally break up the ground surface without dragging and removing all of the topsoil. More particularly, exterior harrowing chains 120 and the interior harrowing chains 122a and b may rotate as they interact with the ground surface causing the harrow disks 234 to rotate and cut through the ground surface. The arrangement of the concave portions of harrow disks 234 may allow parts of the ground surface to pass through the exterior harrowing chains 120 and the interior harrowing chains 122*a* and *b* rather than simply being dragged along, as typically results when conventional chains are pulled across a ground surface.

While this disclosure has described certain embodiments and generally associated methods, alterations, and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for adjusting tension in a harrowing chain, comprising:
   a harrowing chain having a first end and a second end; and
   a tension adjustment assembly, comprising:
      a slider assembly having a first end coupled to the first end of the harrowing chain, the slider assembly configured to slide horizontally;
      a compression plate configured to apply a compression force to a first spring, the first spring configured to apply a spring force to the slider assembly; and
      a height adjustment assembly coupled to the slider assembly, the height adjustment assembly configured to vertically adjust the first end of the harrowing chain.

2. The apparatus of claim 1, wherein the tension adjustment assembly further comprises a second spring configured to receive the compression force from the compression plate and further configured to apply a second force to the slider assembly.

3. The apparatus of claim 1, wherein:
   the tension adjustment assembly is generally aligned with the harrowing chain;
   the tension adjustment assembly further comprises a threaded rod passing through the compression plate; and
   wherein rotating the threaded rod linearly moves the compression plate.

4. The apparatus of claim 3, wherein the tension adjustment assembly further comprises a threaded lug coupled to the compression plate, the threaded rod passing through and cooperating with the threaded lug.

5. The apparatus of claim 1, further comprising a spring-preset bar configured to join the compression plate to the slider assembly in a first orientation and thereby allow the compression plate and the slider assembly to slide as a single unit.

6. The apparatus of claim 5, wherein the spring-preset bar is removable and removing the spring-preset bar separates the compression plate from the slider assembly, the spring-preset bar being further configured to reattach to the tension adjustment assembly in a second orientation.

7. An agricultural implement, comprising:
   a frame having a front end, a rear end, a left side, a right side, and a plurality of tires;
   a plurality of harrowing chains, each harrowing chain having a plurality of harrow disks and a chain having a plurality of links, each harrow disk being coupled to a link of the plurality of links and extending generally outwardly therefrom;
   wherein a first harrowing chain is supported by the frame generally adjacent the front end and the left side, wherein the first harrowing chain extends in a first diagonal direction;
   wherein a second harrowing chain is supported by the frame generally adjacent the front end and the right side, wherein the second harrowing chain extends in a second diagonal direction;
   wherein the first and second harrowing chains are exterior harrowing chains, each exterior harrowing chain having an end coupled to a tension adjustment assembly, each tension adjustment assembly is coupled to the frame;
   wherein each tension adjustment assembly, comprises:
      a slider assembly coupled to an end of the harrowing chain, the slider assembly configured to slide horizontally;
      a compression plate configured to apply a compression force to a first spring, the first spring configured to apply a spring force to the slider assembly; and
      a height adjustment assembly coupled to the slider assembly, the height adjustment assembly configured to vertically adjust the end of the harrowing chain.

8. The agricultural implement of claim 7, wherein a bearing couples each slider assembly to an end of a respective harrowing chain to allow rotation of the harrowing chain with respect to a lower end of the slider assembly.

9. The agricultural implement of claim 7, wherein:
   each harrowing chain has a front end and a rear end, each front end of each harrowing chain being relatively forward of the rear end of the harrowing chain; and
   each harrow disk has a concave side facing a respective harrowing chain front end and a convex side facing a respective harrowing chain rear end.

10. The agricultural implement of claim 7, further comprising:
    a third harrowing chain supported by the frame generally adjacent the left side and the rear end, the third harrowing chain extending in the second diagonal direction;
    a fourth harrowing chain supported by the frame generally adjacent the right side and the rear end, the fourth harrowing chain extending in the first diagonal direction;
    wherein the third and fourth harrowing chains are each exterior harrowing chains having an end coupled to a respective tension adjustment assembly;
    a fifth harrowing chain supported by the frame and extending in a diagonal direction;
    a sixth harrowing chain supported by the frame and extending in a diagonal direction opposite the diagonal direction of the fifth harrowing chain; and
    wherein the fifth and the sixth harrowing chains are interior harrowing chains.

11. The agricultural implement of claim 7, wherein the plurality of tires includes at least five tires.

12. The agricultural implement as in claim 11, wherein:
    a first and a second tire of the plurality of tires are coupled to the frame in a generally central location;
    a third tire of the plurality of tires is coupled to the right side of the frame;
    a fourth tire of the plurality of tires is coupled to the left side of the frame, the first, second, third, and fourth tires being generally aligned with each other; and
    a fifth tire of the plurality of tires is coupled to the rear end of the frame.

13. The agricultural implement of claim 12, wherein only a single tire is coupled to the rear end of the frame.

14. The agricultural implement as in claim 7, wherein:
    the frame has a first folding member that defines the frame left side, the first folding member defining a left exterior and a left interior portion;

the frame has a second folding member that defines the frame right side, the second folding member defining a right exterior and a right interior portion; and each folding member selectively folds upwardly relative to a remainder of the frame and the left exterior and right exterior portions fold inwardly relative to the remainder of the frame, the folding being hydraulically assisted.

15. The agricultural implement of claim 7, wherein:

the frame has a folding member that defines the frame rear end, the rear end folding member selectively folds upwardly relative to the remainder of the frame, the folding of the frame rear end being hydraulically assisted.

16. The agricultural implement of claim 7, further comprising a spring-preset bar configured to join the compression plate to the slider assembly in a first orientation and thereby allow the compression plate and the slider assembly to slide as a single unit.

* * * * *